United States Patent [19]

Yoshida

[11] Patent Number: 4,732,241

[45] Date of Patent: Mar. 22, 1988

[54] DISC BRAKE APPARATUS

[75] Inventor: Takao Yoshida, Saitama, Japan

[73] Assignee: Honda Giken Kogyo Kabushiki Kaisha, Tokyo, Japan

[21] Appl. No.: 873,968

[22] Filed: Jun. 13, 1986

[30] Foreign Application Priority Data

Jun. 14, 1985 [JP] Japan .................................. 60-128007
Jul. 26, 1985 [JP] Japan .................................. 60-163813
Jul. 26, 1985 [JP] Japan .................................. 60-163814

[51] Int. Cl.$^4$ .......................................... F16D 55/228
[52] U.S. Cl. .................. 188/73.34; 188/71.1; 188/344
[58] Field of Search ............ 188/24.12, 24.13, 24.22, 188/26, 91.1, 73.31, 73.34, 73.39, 344

[56] References Cited

U.S. PATENT DOCUMENTS 2,612,968 10/1952 Hood ...................................... 188/26
3,051,272 8/1962 Burnett ............................. 188/73.34
3,088,554 5/1963 Desvignes et al. ............... 188/73.34
3,899,049 8/1975 Martin ............................. 188/26 X Primary Examiner—Duane A. Reger
Attorney, Agent, or Firm—Lyon & Lyon

[57] ABSTRACT

In a disc brake apparatus mounted to a vehicle wheel supported by a fork member, a caliper body is disposed within a space formed inwardly of the fork member and to one side of the vehicle wheel. The caliper member straddles the brake disc from the internal periphery of the brake disc. A bracket integrally formed with the caliper body extends inwardly therefrom in a radial direction to the axle of the wheel where it is pivotally supported. The caliper body is also coupled by a removable pin with the fork member to prevent rotation about the axle. The caliper body is formed with an opening for permitting removal and replacement of the friction pads through the bottom wall portion thereof and the bracket is also formed with an opening for permitting the pads to be fully removed from the vehicle.

6 Claims, 8 Drawing Figures

DISC BRAKE APPARATUS

BACKGROUND OF THE INVENTION

The field of the present invention is disc brakes and the mounting systems thereof for small vehicles such as motorcycles, motor tricycles and the like.

Generally, disc brake devices for vehicle wheels include a ring-shaped brake disc fixed to the vehicle wheel and calipers having friction pads thereon fixed relative to the vehicle to clamp the disc for braking operation. The caliper body for holding and actuating the friction pads, when applied to the front wheel of a motorcycle, is usually mounted along one leg of a front fork either forwardly or rearwardly of the fork on the vehicle. FIG. 1 illustrates such a conventional disc brake apparatus. A lower member or bottom case 01 is associated with the front fork. The bottom case 01 includes integrally formed upper and lower brackets 02 and 03, respectively, projecting backwardly from the case on the vehicle. Mounted to the brackets 02 and 03 with bolts 05 and 06, respectively, is a caliper body 04 which is positioned astride a brake disc 07. The brake disc 07 is fixed to the vehicle wheel in such a manner as to rotate with the vehicle wheel. The caliper body 04 is shown to be positioned over the outer periphery of the brake disc 07 and then extends radially inwardly on either side of the disc. Between the caliper body 04 and the respective sides of the disc 07, friction pads are interposed.

In such a conventional disc brake apparatus such as seen in FIG. 1, the mounting position for the caliper body is limited to an area near the front side of the front fork or near the rear side of the front fork. Accordingly, there is only limited freedom for selecting the mounting position of the caliper in view of the conventional mounting arrangement. On the other hand, such an arrangement has certain advantages such that when the friction pads are worn and need replacement with new pads they can be easily removed by moving them inwardly in the radial direction toward the axle 08.

SUMMARY OF THE INVENTION

The present invention is directed to a disc brake apparatus and the mounting system therefor wherein the mounting position of the caliper body may be positioned at a distance from the front fork. Easy placement and removal of the caliper assembly may also be provided by the present invention. Furthermore, provision can be made in the present invention for facile removal and replacement of friction pads without requiring the removal of the caliper body from the vehicle.

In accordance with the present invention, a disc brake apparatus is employed with a ring-shaped brake disc fixed to the vehicle wheel which is supported by the fork member of a vehicle suspension. A caliper body located inwardly from the adjacent fork member and to one side of the wheel is positioned astride a brake disc mounted to a bracket which is pivotally supported by the axle of the vehicle wheel. A pin member coupled with the fork assembly retains the caliper assembly from freely rotating about the axle under braking loads. The pin member may be removable to allow some pivoting of the caliper assembly for access thereto.

Through the employment of the mounting bracket pivotally supported by the axle, the location of the caliper body may be selected with comparative freedom to accommodate other design requirements. At the same time, through the use of a removable pin, the caliper assembly may be freely pivoted to provide maximum access for service. If the caliper body is arranged such that it spans the disc on the inner periphery thereof, removal and replacement of brake pads radially outwardly is facilitated without removal of the caliper assembly.

In addition to the foregoing advantages, the removal of the entire caliper assembly may be accomplished through a simple removal of the axle and the removable pin. The space and flexibility of such a system also allows for accommodation of access holes in the caliper support bracket such that brake pads may be removed inwardly through access ports and replaced in a similar manner, if desired.

Accordingly, an improved disc brake system including caliper mounting apparatus is provided. Other and further objects and advantages will appear hereinafter.

DETAILED DESCRIPTION OF THE PREFERRED EMBODIMENTS

Figure 1:
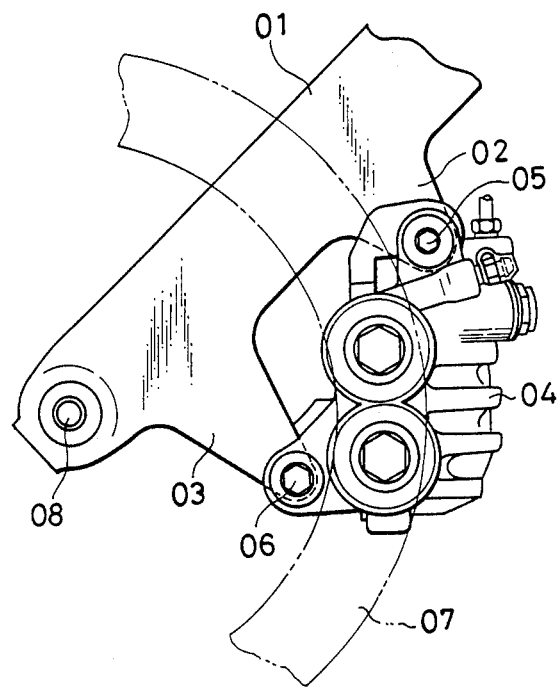
FIG. 1 is a side view of a conventional disc brake.
Figure 2:
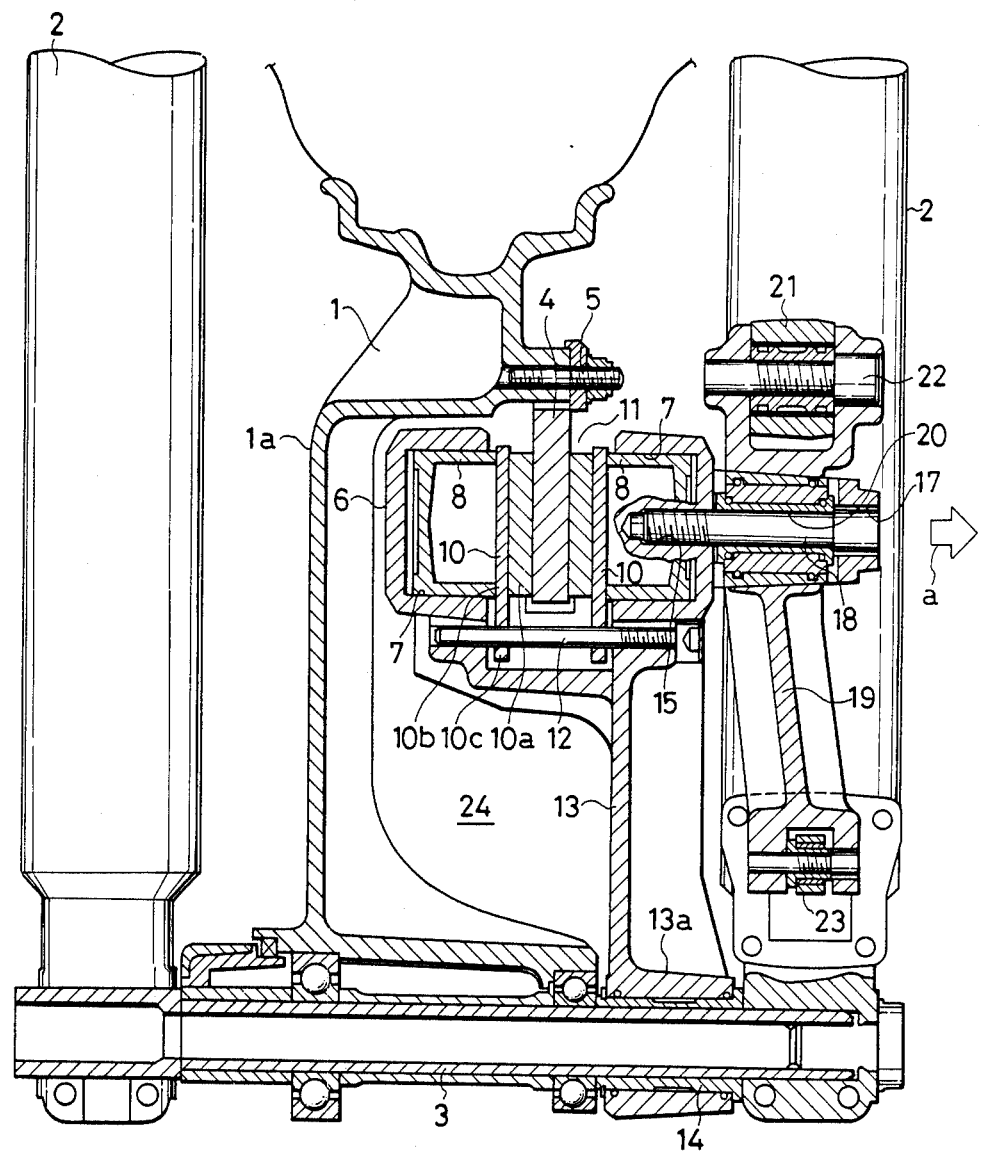
FIG. 2 is a sectional view of a first embodiment of the present invention as viewed from the rear.
Figure 3:
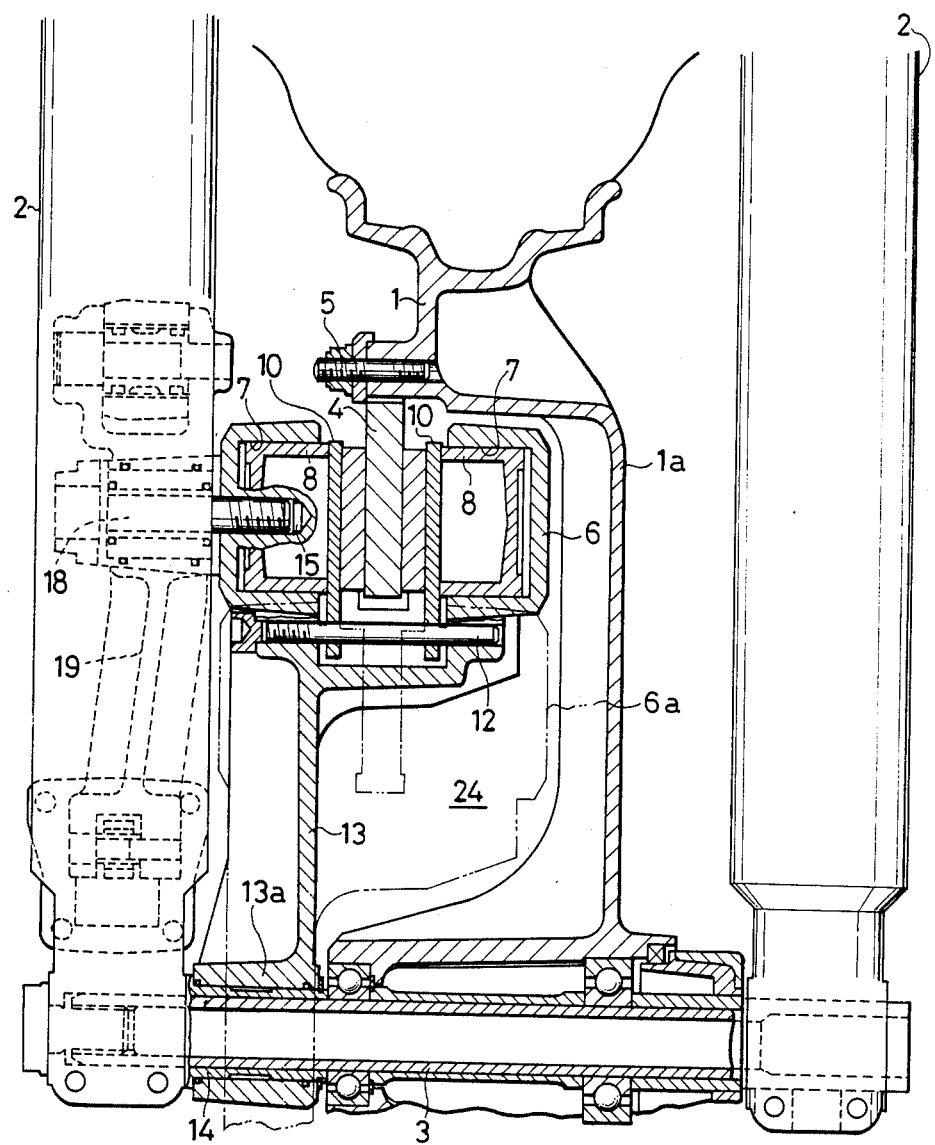
FIG. 3 is a sectional view of the embodiment of FIG. 2 as viewed from the front.
Figure 4:
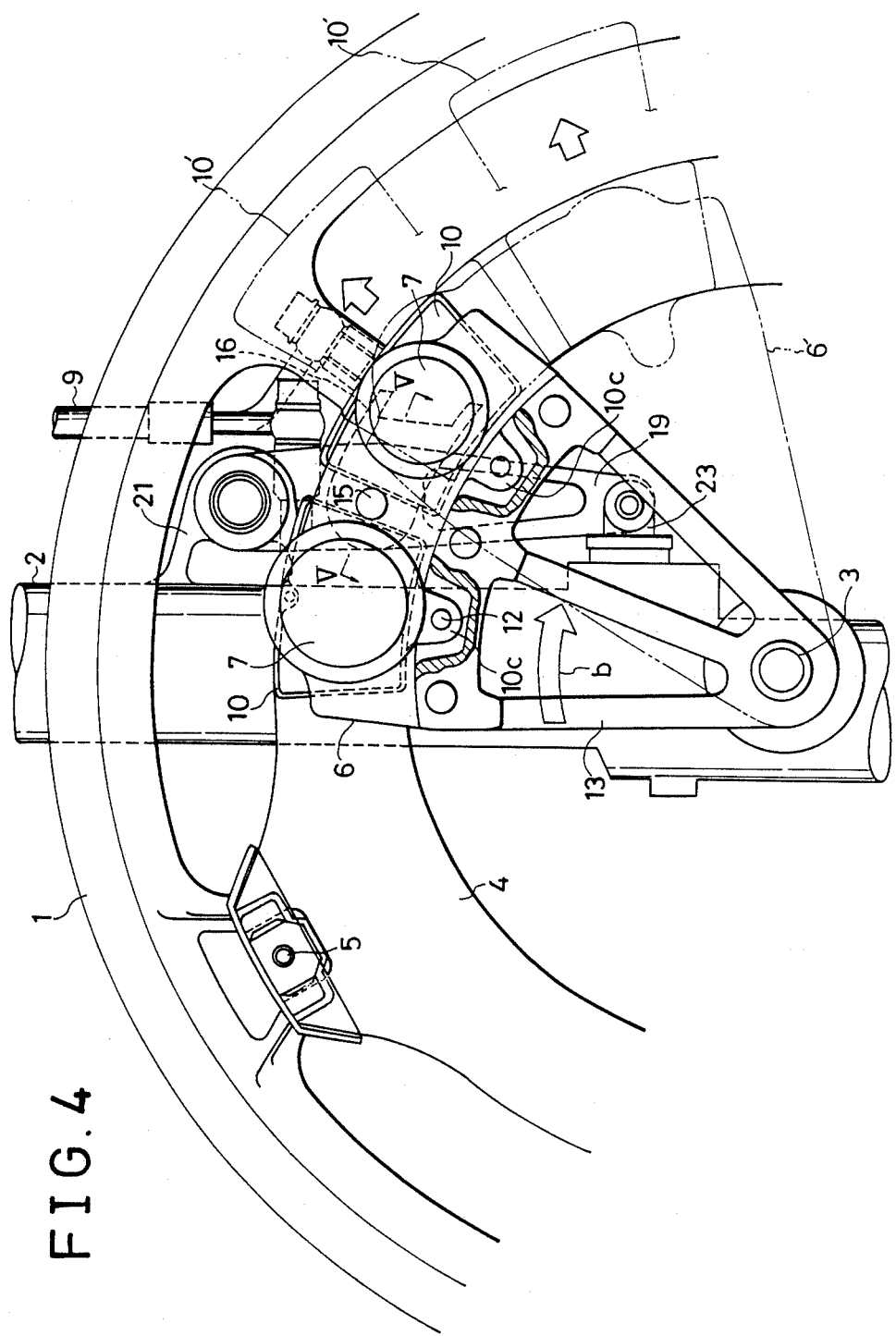
FIG. 4 is a side view of the embodiment of FIG. 1 as viewed from the left side.

Turning in detail to the drawings, FIGS. 2 through 5 illustrate a first embodiment. A front wheel 1 of a motorcycle is rotatably supported by right and left front forks 2 through an axle 3. Fixed to a side portion of the front wheel 1 by a bolt 5 at its outer peripheral portion is a ring-shaped brake disc 4. A caliper body 6 straddles the brake disc 4 from its interior perimeter. A wheel disc 1a of the front wheel 1 is formed such that it has an annular concavity on one side thereof. Between the wheel disc 1a and the right side front fork 2 a space is thus provided to receive the disc brake assembly. The caliper body 6 is contained in that space. The caliper body 6 includes two pairs of cylinders 7 with each pair being opposite to one another on either side of the brake disc 4. Each cylinder 7 includes a piston 8 slidably positioned therein. The pistons 8 are pushed out toward the brake disc 4 by fluid pressure applied to the brake system under braking conditions. The fluid pressure is provided by means of a pipe 9 (FIG. 4) to cause the friction pads 10 to press and clamp either side of the brake disc 4.

The friction pads 10 each comprise a pad piece 10a for coming into contact with the face of the brake disc 4 and a supporting metal back 10b which contact the end faces of the pistons 8. The respective friction pads 10 are inserted into the inside of the caliper body along the end faces of the pistons 8 from an opening 11 formed in the outer peripheral portion of the caliper body 6. Further, the friction pads 10 are slidably supported by pad hanger pins 12 inserted into projecting portions 10c of the pads 10. The pad hanger pins 12 are threadably secured to the caliper body 6. The caliper body 6 is integrally formed with a bracket 13. The bracket 13 is formed in a flat sector shape and extends radially inwardly from the caliper body to the front wheel axle 3. A boss 13a provided at the internal end portion of the bracket 13 is pivotally supported by the axle 3 through a collar 14. The caliper body 6 is also supported on its outer side by employment of a pin receiving hole 15 in an intermediate portion between the cylinders 7. Cooperating with the receiving hole 15 is a pin holder 16 which projects from the caliper body to form a U-shaped receiving area with the outer pin holder 16 extending parallel to the surface 6a of the caliper body 6. The pin holder 16 is provided with a pin holder hole 17 aligned with the pin receiving hole 15. The hole 17 supports a torque bearing pin 18 which is threadably engaged in the pin receiving hole 15. A rod 19 serving as a connecting member passes through the space defined between the external face 6a of the caliper body and the internal face of the pin holder 16. The torque bearing pin 18 extends through a hole 20 formed in the rod 19 and is fixed to the caliper body 6 as mentioned before.

The upper end portion of the rod 19 is pivotally attached to a mounting piece 21 projecting from an upper portion of the rear face of the front fork 2, and more specifically the bottom case thereof, through a bolt 22. The lower portion of the rod 19 is connected to an actuator 23 biased outwardly from the bottom case by a spring provided at the lower portion thereof. When the calipers engage the brake disc 4 to brake the front wheel, a torque produced in the caliper body 6 due to the reaction of the brake loading is transmitted to the actuator 23 through the torque bearing pin 18 and the rod 19. As a result, the actuator 23 is pushed in against the force of the spring. Due to the abutting of the actuator 23 at the main body of the front fork 2, the resistance torque to braking is borne by the front fork 2. Accordingly, the caliper body 6 is not rotated together with the brake disc 4 and, thereby, provides an effective braking function. When the actuator 23 is pushed in, it controls a hydraulic circuit within the front fork 2 to restrict a contraction of the front fork to act as an antidive apparatus.

Figure 5:
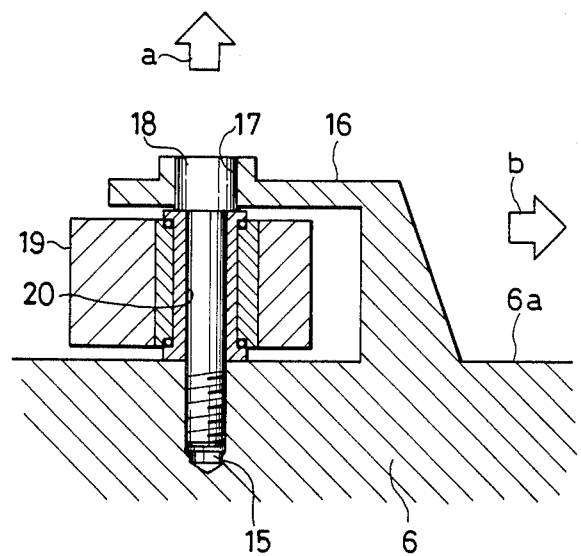
FIG. 5 is a sectional view taken along line V—V of FIG. 4.

In the foregoing embodiment, removal of the torque bearing pin 18 as can be seen in FIG. 5 by arrow a disconnects the caliper body 6 and the rod 19. The caliper can then be pivoted backwardly about the axle 3 as shown by the arrow b in FIG. 5. When the caliper body 6 is moved from the mounting position at the inner side of the front fork 2 to a position where it does not interfere with the front fork, as shown in phantom by line 6' in FIG. 4, it is very easy to pull out the pad hanger pins 12 to withdraw the friction pads 10 from the opening portion 11 outwardly in the radial direction. In this way, the friction pads 10 can be replaced with new ones with ease.

Further with the foregoing embodiment, a large space 24 is presented below the caliper adjacent the vehicle wheel. When the torque bearing pin 18 is removed and the axle 3 is pulled out of the boss portion 13a of the bracket 13, the caliper body 6 can be moved into the space 24 as shown by the phantom lines 6a in FIG. 3 by pulling the caliper body 6 from about the brake disc 4 in an radially inward direction. The caliper, with its caliper body 6 moved into the space 24, can be easily withdrawn from the assembly. Similarly, the caliper can be easily mounted to the front wheel 1 using the reverse process.

Figure 6:
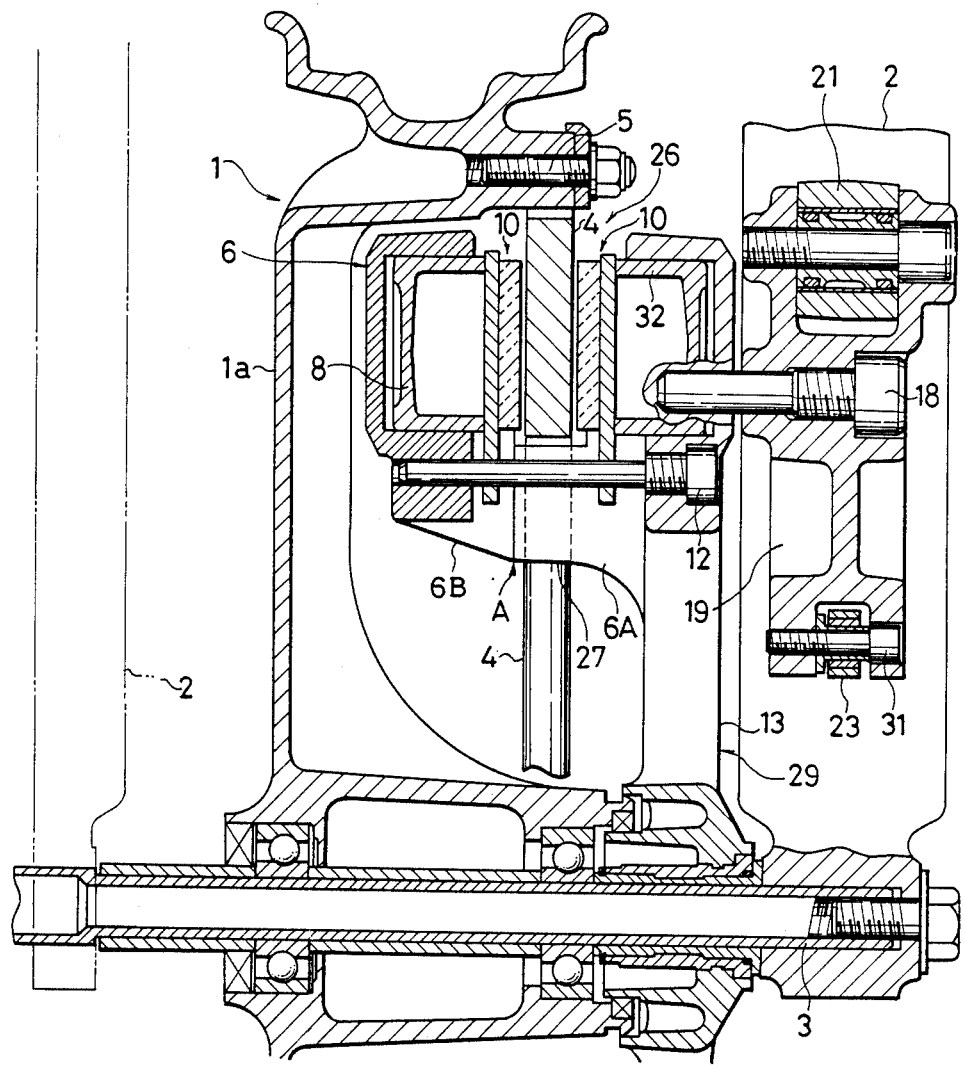
FIGS. 6 and 7 are views similar to FIGS. 2 and 4, respectively, showing a second embodiment of the present invention.
Figure 7:
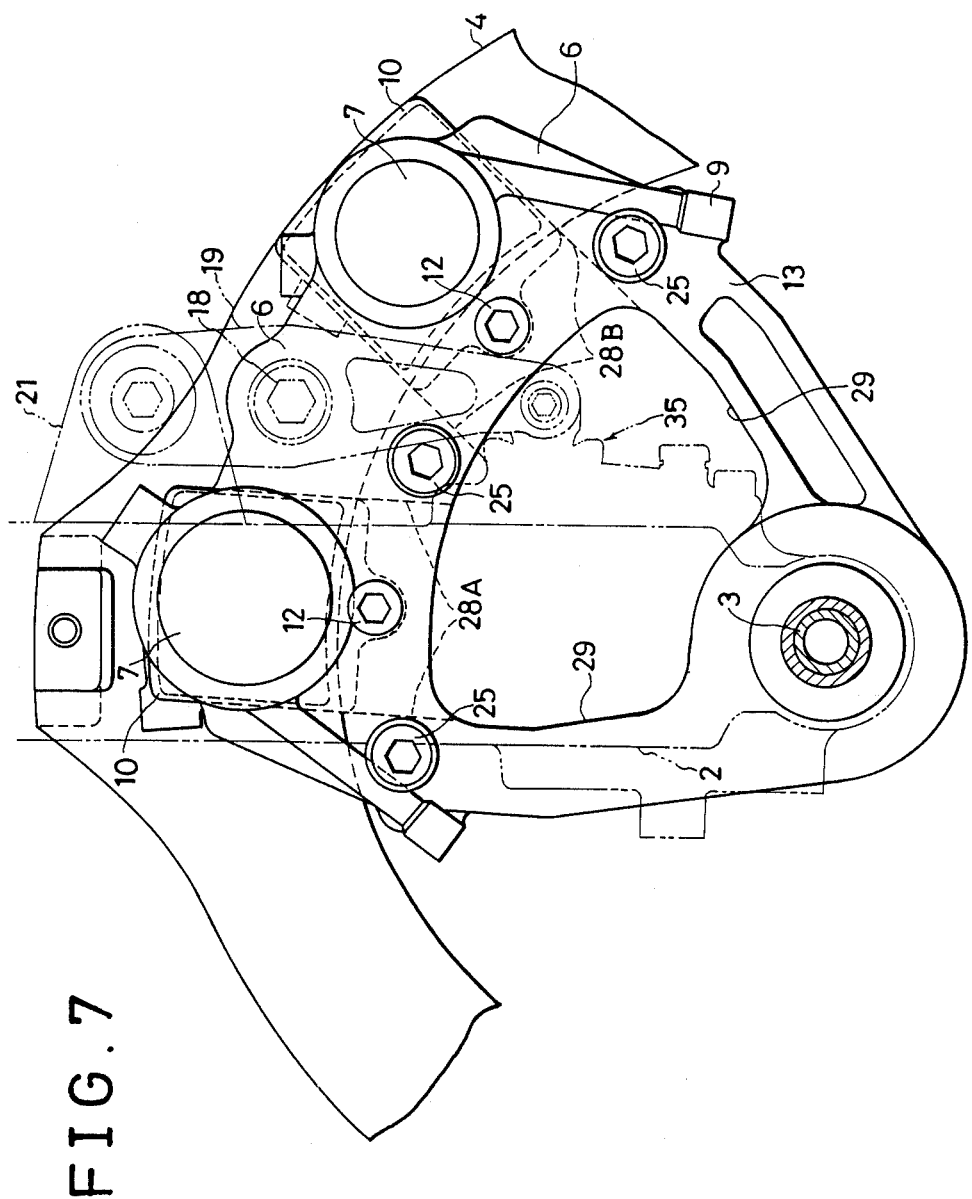
Figure 8:
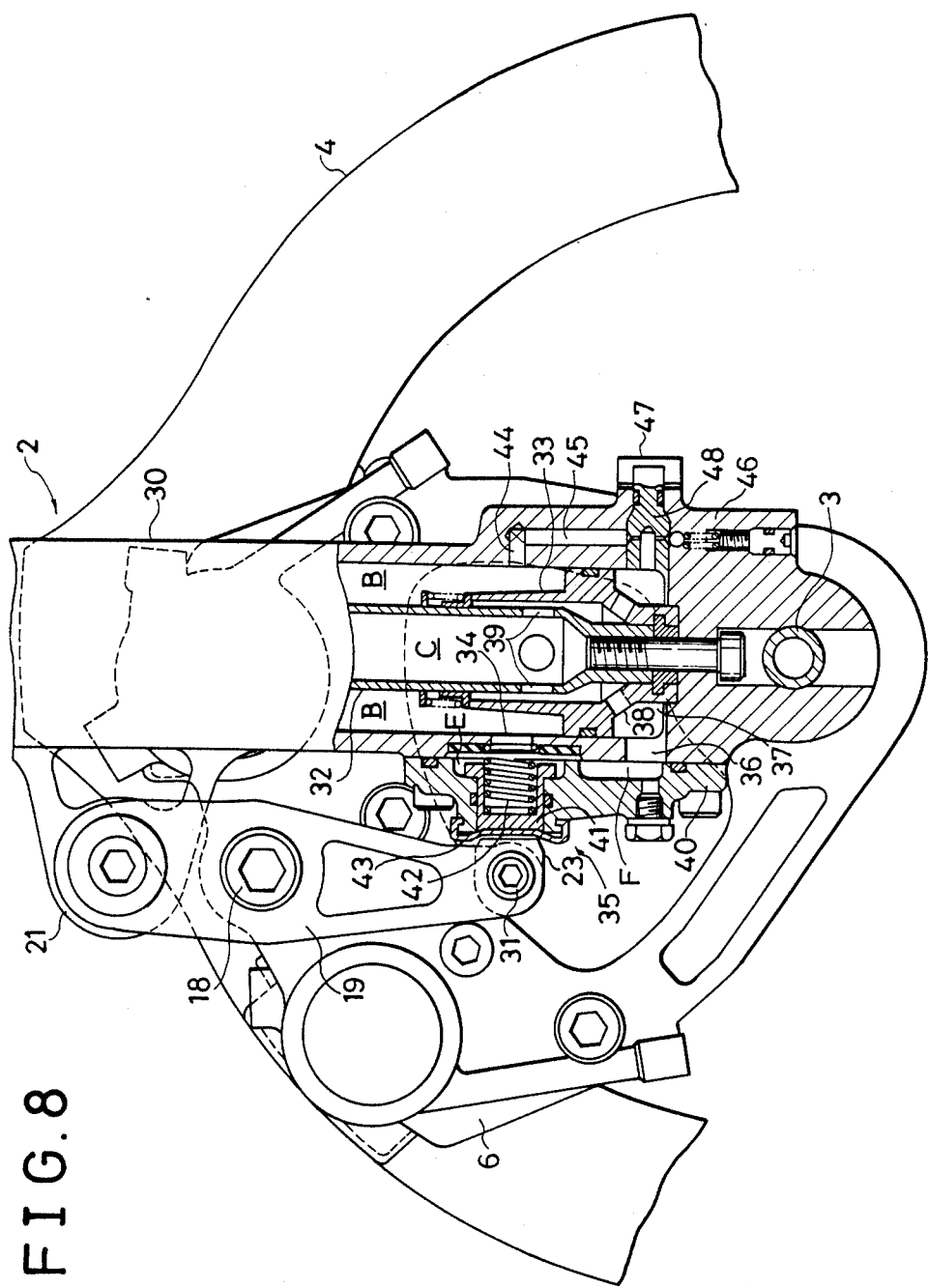
FIG. 8 is a sectional side view of the lower portion of a front fork employing the present invention and showing an antidive mechanism.

FIGS. 6 through 8 illustrate a second embodiment of the present invention. In these figures, identical parts to those illustrated in the embodiment of FIGS. 2 through 5 are denoted by identical reference numerals. The caliper body 6 is divided into two portions 6A and 6B. These two portions abut at the interface A and are bolted together using three tie bolts 25. The caliper body 6 is provided in such a shape as to extend in a U-shaped manner over the brake disc 4 from the internal periphery thereof. The bottom wall 27 of the caliper body 6 is formed with a pair of front and rear openings 28A and 28B in communciation with the space portion 26 wherein the friction pads 10 are positioned. The widths of the openings 28A and 28B in the forward and rearward direction are generally that of the friction pads 10 so that the pads 10 can be pulled out of or pushed through the openings 28A and 28B.

The bracket 13 for connecting the caliper body 6 to the axle 3 extends from one of the caliper body portions 6A inwardly in a radial direction toward the axle 3. The bracket 13 is formed with a large opening 29 for permitting the friction pads 10 to pass therethrough parallel to the axle 3 in communciation with the openings 28A and 28B. Therefore, the brake pads can be easily removed and replaced from inside rather than requiring access from radially outwardly from the caliper body.

Referring now to FIG. 8, an antidive mechanism connected to the caliper body 6 through the rod 19 is described. This device is equally applicable to the embodiment of FIGS. 2 through 5. A telescopic front fork is shown to be comprised of a bottom case 30 and a fork pipe (not shown) slidably fitted within the bottom case 30. An upper end of the rod 19 is shown to be swingably supported on a rear face of the bottom case 30 through a mounting piece 21. Connected to an intermediate portion of the rod 19 through the torque bearing pin 18 is the caliper body 6. A lower end portion of the rod 19 is formed in a fork shape which is pivotally attached to the actuator 23 through a pin 31.

Fixed to the lower end of the inside of the bottom case 30 is a seat pipe 32 and a cylindrical partition member 33. An upper end portion of the seat pipe 32 is slidably fitted to the fork pipe and is sealed to prevent fluid flow therebetween. A chamber B formed between the bottom case 30 and the seat pipe 32 and a chamber C formed within the seat pipe 32 are filled with shock-absorbing oil. The oil, when the front fork 2 is expanded and contracted, flows from the chamber B to the chamber C or returns through a main communication oil path. The main path comprises an opening 34 formed in the bottom case 30, a cylindrical chamber E of a contraction motion restricting apparatus 35 provided on a rear face at the lower end portion of the bottom case 30, a chamber F of the contraction motion restricting apparatus 35, an opening 36 formed in the bottom case 30, an annular path 37 formed between the bottom case 30 and the partition member 33, an opening 38 formed in the partition member 33, and an opening 39 formed in the seat pipe 32.

The contraction motion restricting apparatus 35 comprises a housing 40 forming the cylindrical chamber E and the chamber F. The housing 40 is fixed to a seat face formed in the bottom case 30. The actuator 23 has an internal end portion which forms a cylindrical piston 41. A compression coil spring 42 biases the actuator 23 away from the bottom case 30. A rubber boot 43 protects the actuator and the housing. On the other side of the lower end portion of the bottom case 30 is a protruding portion 46 having an opening 44 and a bypass oil path 45. A flow rate regulating orifice member 48 is inserted into the bypass oil path 45 having a plurality of orifices of different sizes and a grip portion 47 for rotating the device to select among the orifices.

Due to a reaction torque transmitted to the actuator 23 from the caliper body 6 through the torque bearing pin 18 and the rod 19 when braking is experienced, the piston 41 is caused to progress forwardly and hit the wall face of the bottom case 30 at the peripheral portion of the opening 44. As a result, the main communication oil path is cut off and the chamber B and chamber C are communicted only through a selected orifice of the orifice member 48 through the bypass oil path 45. Accordingly, the shock absorbing oil within the chamber B slowly flows into the chamber C while experiencing large flow path resistance because of the selected orifice. Accordingly, the front fork 2 cannot contract suddenly and diving of the front portion of the vehicle is prevented.

In the foregoing embodiments since the connecting member provided by the rod 19 for connecting the caliper body 6 to the fork member 2 is combined with the antidive mechanism, the connecting member is disposed along the fork member 2. Generally, however, the connecting member is not necessarily disposed along the fork member. Instead, the connecting member may be extended in a desired direction from one point on the fork member according to the mounting position of the caliper body. The caliper body can be disposed at a position about the peripheral portion of the brake disc as desired. Thus, freedom of design is realized as compared with conventional disc brake apparatus.

The caliper body 6 in these embodiments is disposed such that it straddles the brake disc 4 from the internal periphery. The caliper body 6 is thus found to be more compact and provide a simple, clean appearance.

Accordingly, preferred mounting arrangements are disclosed for disc brake calipers. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A disc brake apparatus for a vehicle having a front fork, a front axle mounted to the fron fork, a front wheel mounted about the axle and a brake disc mounted to rotate with the front wheel, comprising:
    a caliper body disposed intermediate said front fork and said front wheel and having opposed, generally hollow cylindrical body portions in spaced relation to said brake disc;
    operating pistons in each of said body portions and extending into the space between said brake disc and said body portions;
    friction pads for engaging said brake disc operably disposed in said space between said operating pistons and said brake disc;
    a hanger pin releasably connected to said caliper body slidably engaging said friction pads;
    a bracket fixed at one end to said caliper body and pivotally mounted at its other end to said front axle; and
    a releasable coupling pin securing said caliper body to said front fork, whereby release of said coupling pin permits rotation of said bracket and said caliper body to an access space and release of said hanger pin permits release of said friction pads from said caliper body into said access space.

2. The dixc brake apparatus of claim 1 in which said caliper body portions are integrally formed on said bracket and said space between said body portions and said brake disc opens radially outwardly from said caliper body.

3. The disc brake apparatus of claim 1 in which said caliper body includes a radially inwardly extending opening sized to permit passage of said friction pad upon release of said hanger pin.

4. The disc brake apparatus of claim 3 in which said bracket includes angularly spaced bracket portions extending between said ends thereof and defining said access space therebetween.

5. A disc brake apparatus for a vehicle having a front fork, a front axle mounted to the front fork, a front wheel rotatably mounted about the axle and a brake disc mounted to rotate with the front wheel, comprising:
    a caliper body disposed adjacent said fron wheel and inwardly of said front fork and positioned astride the brake disc from the inner periphery thereof;
    a bracket fixed to said caliper body and extending radially inwardly to said axle and being pivotally supported thereon;
    a coupling pin removably affixed to said caliper body and coupling the front fork therewith;
    friction pads interiorly of said caliper body;
    a hole through the radially inner side portion of said caliper body to allow displacement of said friction pads from assembly with said caliper body radially inwardly toward the axle for removal thereof; and
    means forming an opening extending through said bracket in a direction parallel to said axle said hole being sufficiently large to receive and pass said friction pads therethrough.

6. The disc brake apparatus of claim 5 further comprising an open space inwardly of said caliper body and equal in size thereto between the front form and said wheel.

* * * * *

UNITED STATES PATENT AND TRADEMARK OFFICE
CERTIFICATE OF CORRECTION

PATENT NO. : 4,732,241
DATED : March 22, 1988
INVENTOR(S) : TAKAO YOSHIDA

It is certified that error appears in the above-identified patent and that said Letters Patent are hereby corrected as shown below:

In column 5, line 51, delete "fron" and insert therefor -- front --.

In column 6, line 18, delete "dixc" and insert therefor -- disc --.

In column 6, line 36, delete "fron" and insert therefor -- front --.

In column 6, line 55, delete "form" and insert therefor -- fork --.

Signed and Sealed this

Twenty-ninth Day of November, 1988

Attest:

DONALD J. QUIGG

*Attesting Officer*  *Commissioner of Patents and Trademarks*